United States Patent [19]

Moeser

[11] 3,891,269

[45] June 24, 1975

[54] SEAT MOUNTING MECHANISM

[76] Inventor: Denis S. Moeser, P.O. Box 9108, Clayton, Mo. 63117

[22] Filed: Mar. 16, 1973

[21] Appl. No.: 341,876

[52] U.S. Cl. ........... 297/252; 297/DIG. 4; 248/430; 16/35 R
[51] Int. Cl. ............................................. A47c 15/00
[58] Field of Search .......... 297/311, 346, 344, 252, 297/DIG. 4, 47; 248/424, 430; 16/35 R

[56] References Cited
UNITED STATES PATENTS

| 2,648,849 | 8/1953 | Webb | 297/DIG. 4 |
| 2,812,041 | 11/1957 | Mugler | 16/35 R |
| 2,903,047 | 9/1959 | Funyak | 248/430 |
| 3,113,804 | 12/1963 | Ritter | 297/252 |
| 3,789,444 | 2/1974 | McCord | 297/252 |

FOREIGN PATENTS OR APPLICATIONS

| 408,334 | 9/1966 | Switzerland | 16/35 R |

Primary Examiner—Francis K. Zugel
Attorney, Agent, or Firm—Koenig, Senniger, Powers and Leavitt

[57] ABSTRACT

A mounting mechanism for a seat reciprocally movable on a surface is provided with a seat support having wheels for rolling engagement on the surface. A locking member is selectively movable between a locking position in which the locking member is releasably engaged between at least one of the wheels and the surface to prevent movement of the seat support on the surface in one direction and a released position in which said locking member is not engaged with both the one wheel and the surface to permit movement of the seat support along the surface in the one direction.

23 Claims, 8 Drawing Figures

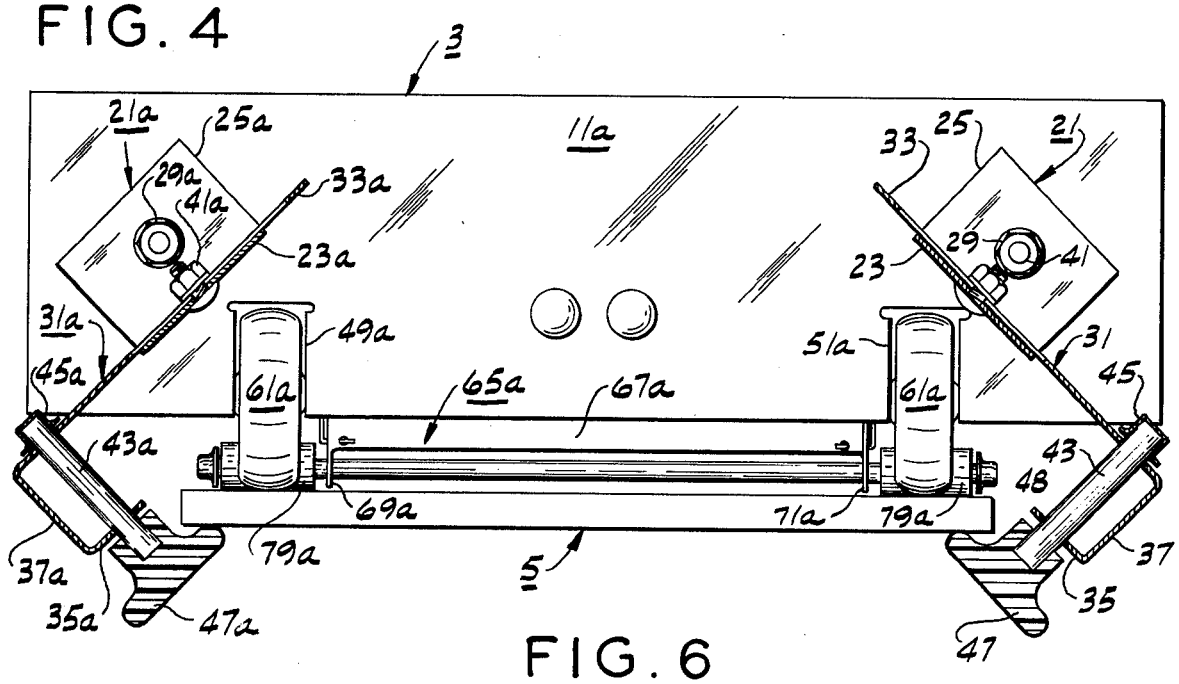
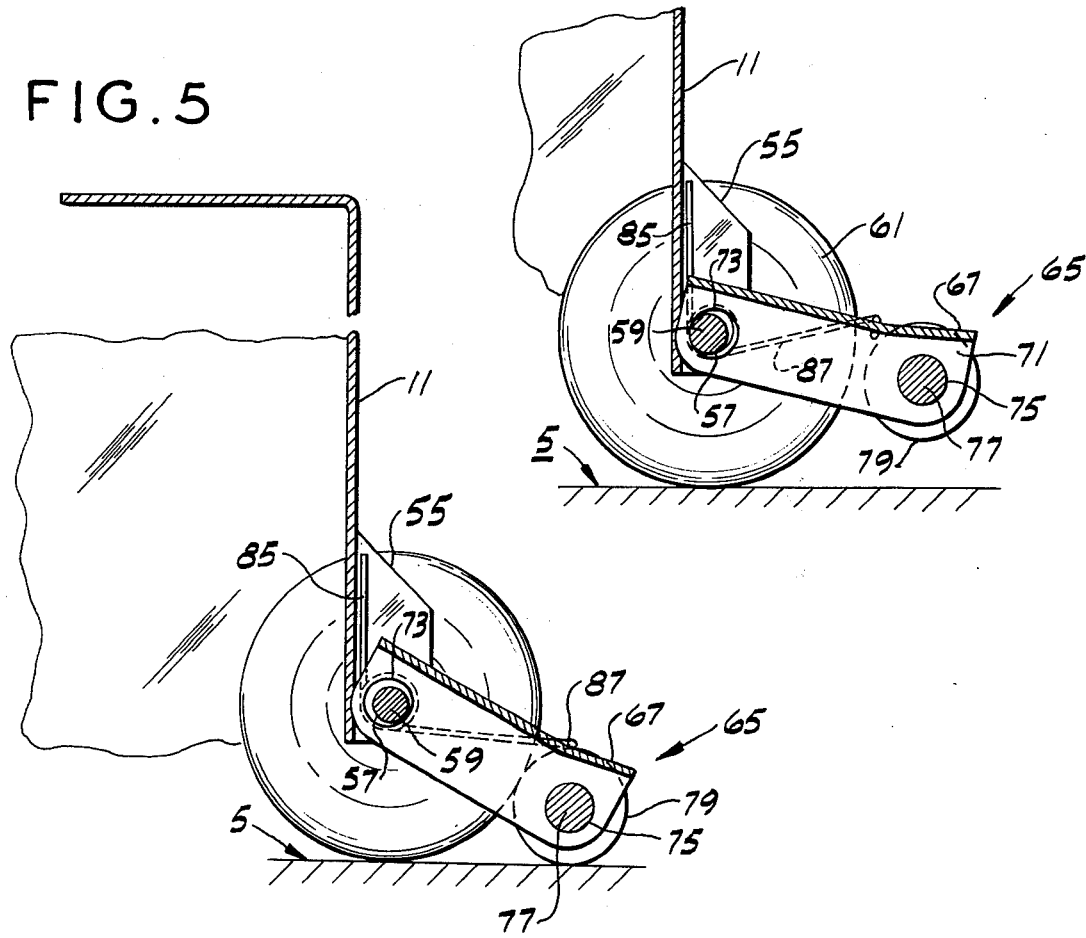

SEAT MOUNTING MECHANISM

BACKGROUND OF THE INVENTION

The invention relates generally to a mounting mechanism for a seat and in particular to those resiprocally movable along a surface.

In smaller boats, such as for instance a jon boat or other fishing or game type boats, widened thwarts serve not only for structural support between the gunwales but also as seats for the boatman and passengers. One may shift his position along the thwart seat to balance the load in the boat under various conditions encountered. For instance, the boatman usually locates himself adjacent the extreme starboard side of the boar in order to actuate the combined throttle and steering lever of the outboard motor in order to compensate for the fly-wheel thrust inherent in the outboard motor. However, when the outboard motor is stopped to drift or drop anchor to fish or work nets, or the like, the boatman finds himself in an extremely unsafe, unbalanced and uncomfortable position on the starboard side of the thwart seat, and since the fly-wheel thrust of the outboard motor is stopped, the boatman repositions his weight by sliding along the thwart seat toward the centerline of the boat in order to keep the boat on an even keel. If the boat is provided with a trolling motor mounted on the starboard side of the boat transom, the boatman must necessarily farther reposition himself on the thwart seat in order to permit right- or left-hand casting while operating the trolling motor. When passengers are aboard and want or need to shift position, the problem of maintaing the boat in trim and maintaining convenient fishing positions within the boat is further complicated. Over an extended period of time, the back-and-forth sliding movement is rather tiring, particularly in wide boats, and uncomfortable since the thwart seats do not provide any back support.

In order to provide more comfort for the boatman, some boats are now provided with plastic or fiber glass molded contour seats which are sometimes referred to as "legless chairs," and these molded seats are mounted on the thwart seats. While these molded seats are rotatable and provide the boatman and passengers with the desirable backrest for comfort, the seats are either permanently mounted or can only be moved by remounting in another position.

SUMMARY OF THE INVENTION

Among the several objects of this invention may be noted the provision of a mounting mechanism for a seat which is normally locked in a desired position but may be easily released for rolling movement in any new desired position and which will automatically lock at that new position; the provision of such a seat mounting mechanism which may be conveniently operated by one hand; the provision of a seat mounting mechanism which is selectively movable along the thwart seat of a boat to facilitate changes in the boatman's and passengers' positions to accommodate boating and fishing conditions; the provision of a seat mounting mechanism of the type described which is adjustable to accommodate varying widths of thwart seats and is releasably secured against vertical displacement therefrom while permitting reciprocal movement therealong. Other objects and features will be in part apparent and in part pointed out hereinafter.

Briefly, the present invention comprises a mounting mechanism for a seat and having wheels for rolling engagement on a surface, locking means selectively movable between a locking positionn in which it is releasably engaged between at least one of the wheels and the surface to prevent movement of the mounting mechanism in one direction on the surface and a released position in which the locking means is not engaged with both the wheel and the surface thereby to permit movement of the mounting mechanism along the surface in the one direction. The locking means are normally biased toward the locking position and means are provided for moving the locking means to the released position. The invention also includes an electric motor drive assembly for selectively effecting reciprocal movement of the mounting mechanism on the surface.

BRIEF DESCRIPTION OF THE DRAWINGS

FIG. 4 is a section generally on line 4—4 of FIG. 2;

FIG. 5 is an enlarged section on line 5—5 of FIG. 2 illustrating a locking means in its locking position;

FIG. 6 is a view similar to FIG. 5 showing the locking means of FIG. 5 in its released position;

Corresponding reference characters indicate corresponding parts throughouut the several views the drawings.

DESCRIPTION OF PREFERRED EMBODIMENTS

Figure 1:
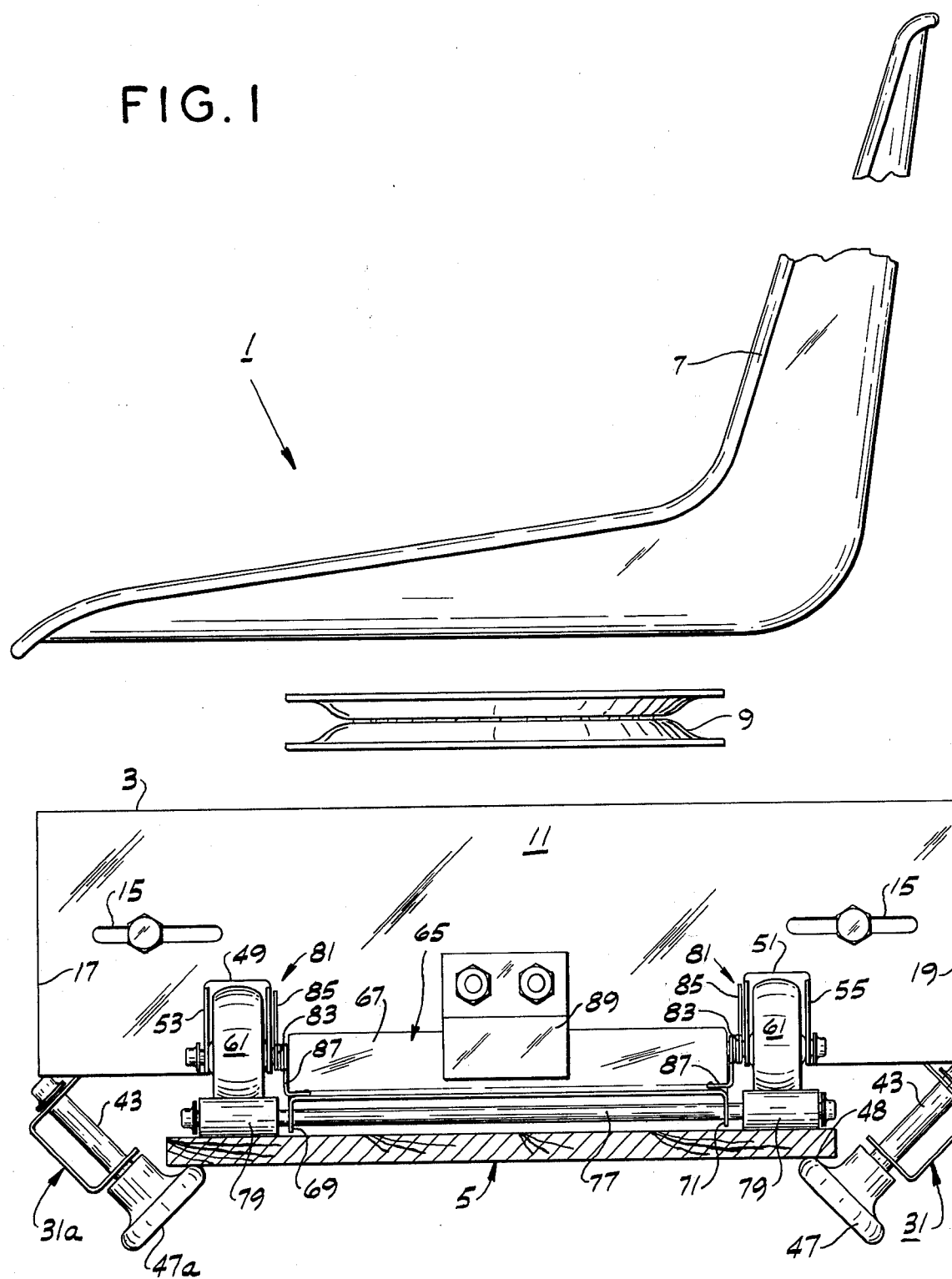
FIG. 1 is a side elevation of a mounting mechanism of the present invention showing in exploded manner a molded seat and thrust bearing.
Figure 2:
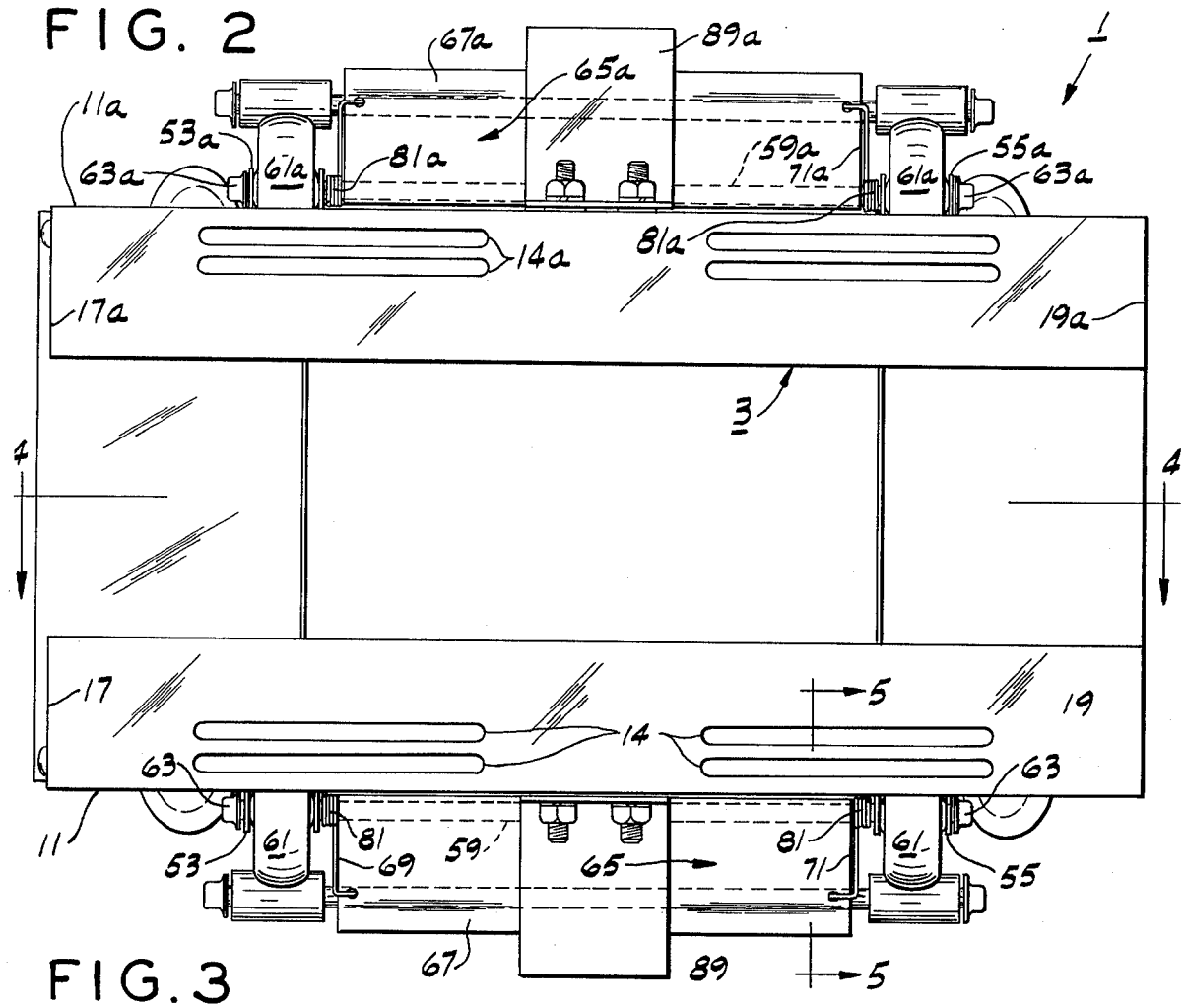
FIG. 2 is a plan of the mounting mechanism of FIG. 1.

Referring now to the drawings, and in particular to FIGS. 1 and 2, a seat mounting mechanism, indicated generally at 1, is provided with a seat support or carriage 3 which is reciprocally movable along a flat surface or elongate member 5, such as, for instance, an athwartship mounted boat seat. Contoured seat 7 is rotatably mounted on the support by a thrust bearing 9. Seat support 3 has opposed generally vertically extending side members or portions 11,11a, and since the side members are of identical construction, only the side member 11 is shown in detail, but the corresponding component parts of each side member 11,11a are described hereinafter. The upper portion of support 3 has flanges 13,13a integral with side members 11,11a and these flanges are provided with elongate and aligned pairs of slots 14,14a therethrough for adjustably securing the thrust bearing 9 and seat 7 thereto. Pairs of lengthwise or horizontally extending slots 15,15a are provided in the side members 11,11a adjacent the opposite ends 17, 19 and 17a, 19a thereof, respectively.

Figure 3:
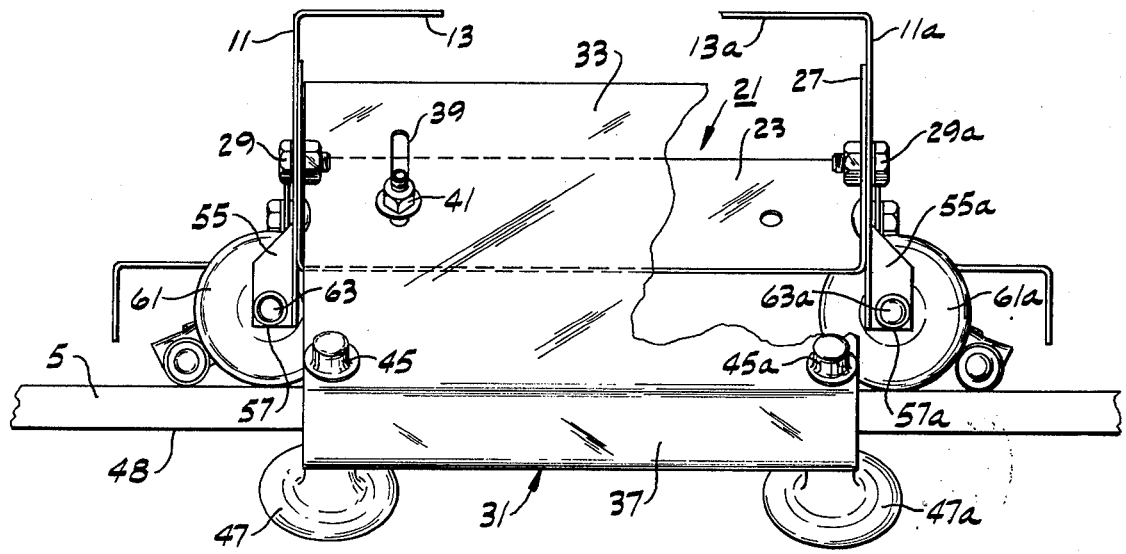
FIG. 3 is a rear elevation of the mounting mechanism of FIG. 1 partly broken away.
Figure 7:
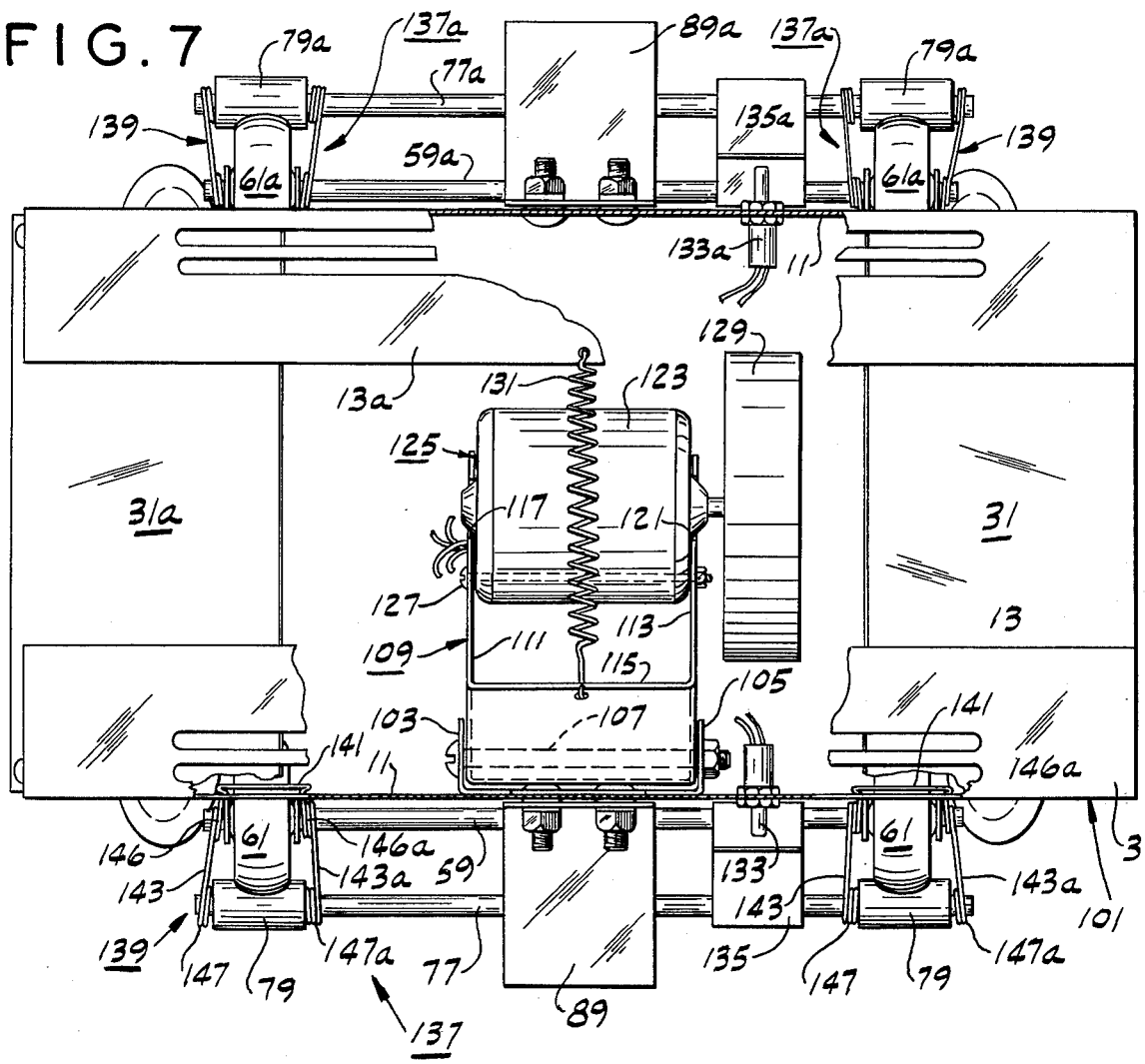
FIG. 7 is a plan of an alternative mounting mechanism of the present invention, partially broken away to illustrate a drive therefor.

Referring now also to FIGS. 3–5, the yoke members 21,21a of identical construction are provided further to secure side members 11,11a in spaced apart relation. These yokes or straps 21,21a have substantially flat midportions 23,23a with integrally formed flanges 25,27 and 25a,27a on the opposite ends thereof. Yokes 21,21a may be adjustably positioned relative to side members 11,11a, by a plurality of nut and bolt assemblies 29,29a which are slidable in slots 15,15a.

Secured to yokes 21,21 are identically generally J-shaped brackets 31,31a having opposed legs 33,35 and 33a,35a and base portions 37,37a integrally formed therebetween. Legs 33,33a have pairs of and adjusting slots 39,39a, aand nut and bolt assemblies 41,41a are provided to secure brackets 31 and 31a in adjusted positions on yokes 21 and 21a. Two pairs of shafts 43,43a are journaled in the legs 33,35 and 33a, 35a and carry rollers 47,47a on the lower ends thereof and are retained for rotation on brackets 31,31a by pawl nuts 45,45a. Brackets 31,31a are mutually adjusted so that rollers 47,47a are in rolling and vertical displacement-preventing engagement with the undersurface 48 of seat 5.

The lower margins of seat support side members 11, 11a have spaced openings or notches 49, 51 and 49a, 51a, the sides of the openings being respectively defined by struck-out pairs of flanges 53, 55 and 53a, 55a which extend substantially normally to the side members. Each of the flanges 53, 55 and 53a, 55a is provided with openings 57, 57a therethrough, and the openings are aligned with each other to receive axles or shafts 59, 59a. Pairs of wheels 61, 61a are respectively disposed in the side member openings 49, 51 and 49a, 51a and rotatably received on the axles 59, 59a. The axles are maintained against displacment from the flange openings 57, 57a by suitable means, such as the pawl nuts 63, 63a, Arm members, indicated generally at 65, 65a, comprise webs 67, 67a with integral depending flanges 69, 71 and 69a, 71a resepectively adjacent the opposite ends thereof and are pivotally mounted on axles 59, 59a which are received in pairs of aligned openings 73, 73a provided in each of the depending flanges. Rotatably journaled in other openings 75 and 75a at the other ends of arms 65, 65a are two axles 77. Pairs of compressible resilient rollers 79, 79a, which constitute locking means, are carried on the opposite ends of the axles 77, 77a adjacent wheels 61, 61a for locking, braking or wedging engagement in the nips between the wheels and the upper surface of boat seat 5. The openings 73, 73a are predeterminately oversized with respect to the axles 59, 59a to provide a lost-motion connection between the support 3 and the rollers 79, 79a. If desired, openings 75, 75a may also be predeterminately oversized with respect to the axles to the axles 77, 77a to provide further lost motion. Rollers 79, 79a, which are of circumference substantially less than that of wheels 61, are biased toward a locking position by pairs of torsion springs 81, 81a having loop portions 83, 83a and integral torsion arms 85, 87 and 85a, 87a. The loop portions are carried on the axles 59, 59a while the ends of torsion arms 85, 87 and 85a, 87a engage the side members 11, 11a and the outer margins of webs 67, 67a, respectively, thereby urging the rollers 79, 79a downwardly into rolling engagement with the elongate member 5. To complete the description of the mounting mechanism, bumper 89, 89a aresecured to the side members 11, 11a to extend normally therefrom. These are optionally provided to limit sidewise movement by engaging the gunwales or sides of the boat.

With the component parts of the seat mounting mechanism positioned as shoen in FIGS. 1–5 and as described hereinbefore, the seat mounting mechanism 1 is adapted to be selectively reciprocally movable along seat 5. It should be noted that the roller pairs 79, 79a are biased by springs 81, 81a into engagement with the top surface of seat 5. Any incipient movement of the carriage or mounting mechanism 1 causes the compressible rollers 79, 79a and the top surface of seat 5. Thus the occupant of contour seat 7 is securely positioned against sidewise moovement and carriage 1 is held by rollers 47 and 47a against any forward or backward tipping. To move to the port or starboard, the occupant of seat 7 merely lifts the outer margin of the web portion of arm 65 (or 65a) thereby moving the respective set of rollers 79 (or 79a) into a released position in which they are not engaging both the wheels 61 (or 61a) and the top surface of seat 5. Upon reaching the desired new position, the occupant merely releases the lifted arm 65 (or 65a) and the seat mounting mechanism remains automatically locked against further movement.

It will be noted that the lost-motion connection between rollers 79, 79a and the carriage facilities locking or wedging engagement of these rollers in the nip between the respective wheels 61 and 61a and the top surface of seat 5, and also the release of these rollers as these locking means are moved from their locking to their released position.

If the operator desires to transfer seat mounting mechanism 1 from thwart seast 5 of one boat to that of another boat, the nut and bolt assemblies 41, 41a are released to permit outward movement of brackets 31, 31a, thus disengaging or releasing rollers 47, 47a from their normal position in vertical displacement-preventing engagement with the undersurface 48 of seat 5. It can be lifted and repositioned on the thwart seat of the other boat and readjusted thereon.

Figure 8:
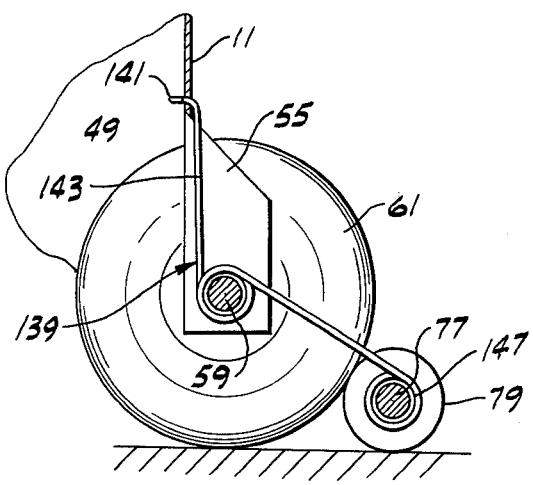
FIG. 8 is a view showing certain details of the locking means of the FIG. 7 mounting mechanism.

From the foregoing, it is apparent that the yokes 21, 21a may be adjustably positioned with respect to the side members 11, 11a, and brackets 31, 31a may be respectively adjusted so that the mounting mechanism 1 is readily movable from boat to boat and used on seats of different widths. It is also apparent that the mounting mechanism 1 is reciprocally movable on an elongate member merely by interrupting the locking engagement of the rollers 79 (79a) between the wheels 61 (61a) and the surface of member 5 in the direction the occupant of seaat 7 desires to move. Referring now to FIG. 8, another seat mounting mechanism 101 is shown having substantially the same component parts and functioning substantially in the same manner as the previuosly described seat mounting mechanism 1 with the following exceptions.

A pair of mounting flanges 103, 105 are connected to the interior portion of the side member 11 extending generally normally thereof, and a shaft, such as the bolt 107, is engaged between the mounting flanges. A substantially J-shaped motor mount 109 is provided with opposed sides 111, 113 integrally connected by a base wall 115. The sides 111, 113 of the motor mount 109 are pivoted on the shaft 107 adjacent the motor mount base wall 115, and recesses 117, 121 sre respectively provided in the distal or free ends of the motor mount sides 111, 113 supportingly engaging or cradling with a frame 123 of a reversible electric motor 125. One of the through bolts 127 of the motor 125 has opposite ends in displacement-preventingengagement with the sides 111, 113 of the motor mount 109 to fixedly position the motor relative thereto. The motor 125 drives electrically powered. means, such as a driving or friction wheel 129, which frictionally ehgages the top surface of seat 5, and a spring 131 biases the motor mount 109 about the shaft 107 to urge the driving wheel 129 into driving engagement with the seat 5. Motor energizing or actuating switches 133, 133a are mounted in the side walls 11, 11a of the seat support 3, and are actuated by levers 135, 135a pivotally mounted on the axles 59, 59a and project outwardly so that the free ends thereof rest on axles 77, 77a. When the operator lifts axle 77 or 77a the rollers 79 or 79a are moved to their released position and the lever 135 or 135a actuates its associated switch 133. In this manner, energization of the reversible motor 125 is effected in the desired direction of rotation to actuate the driving wheel 129 and effect movement of the mounting mechanism 1 in the direction of the released rollers 79 or 79a as desired.

In this embodiment, instrad of using stampings 67, 67a as arms for pivotally supporting the locking means, rollers 79, 79a, the arms are resilient spring members generally indicated at 137, 137a a constituted by resilient torsion springs 139 having base portion 141 with spaced depending arms 143, 143a. Each of these arms has two loops or coiled portions 146, 147 and 146a, 147a which are respectively aligned. The axles 59, 59a are received in the coiled portions 146, 146a of the springs 139, and the axles 77, 77a are received in the coiled portions 147, 147a. The arms 143, 143a engage the seat support sides 11, 11a urging or biasing rollers 79, 79a into engagement with the top surface of seat 5, and the base portion 141 is snapped in the seat support beside openings 49, 51 and 49a, 51a in displacementpreventing engagement with the seat support sides 11, 11a, respectively. If desired, one or both of the aligned coil portions 146, 146a and 147, 147a; can be made predeterminately oversized with respect to the axles 59, 59a and 77, 77a received therein to, in effect, define the aforementioned lost-motion connection between support 3 and roller pairs 79, 79'a.

From the foregoing, it is now apparent that novel seat mounting mechanisms 1 and 101 are disclosed meeting the objects and advantageous features set forth hereinbefore, as well as others. While the seat mounting mechanisms 1 and 101 have been disclosed in the environment of a boat and movable along the thwart seat thereof, it is to be understood that the seat mounting mechanisms are operable on any flat surface, such as a floor or scaffold, and therefore it is not intended that the mounting mechanism be limited, in any manner, to the enviornment in which it is described particularly herein. As various changes could be made in the above constructions without departing from the scope of the invention, it is intended that all matter contained in the above description or shown in the accompanying drawings shall be interpreted as illustrative and not in a limiting sense.

What is claimed is:

1. A mounting mechanism for a seat reciprocally movable along a flat surface comprising a support for said seat having wheels for rolling engagement on said surface, locking means selectively movable between a locking position in which said locking means concurrently releasably engages at least one of said wheels and said surface to prevent movement of said support on said surface in one direction and a releaed position in which said locking means is not engaged with both said one wheel and said surface thereby to permit movement of said support along said surface in said one direction, said locking means comprising a roller normally biased toward the locking position and of a circumference substantially less than that of the wheel, and means for moving said locking means to said released position.

2. A mounting mechanism as set forth in claim 1 which further includes an additional such roller locking means selectively movable between a locking position in which it concurrently releasably engages at least one of said wheels and said surface to prevent movement of said support on said surface in an opposite direction and a released position in which the additional locking means is not engaged with both said one wheel and said surface thereby to permit movement of said support along said surface in the other direction, and having additional releasing means for selectively moving said additional locking means to a released position.

3. A mounting mechanism as set forth in claim 1 in which said roller is substantially more resilient than said wheel and in the locking position said roller is compressed by being piinched in the nip between one side of said wheel and said surface.

4. A mounting mechanism as set forth in claim 3 in which said roller is mountned for rotation at one end of an arm which is movably mounted on said support.

5. A mounting mechanism as set forth in claim 4 which further includes spring means biasing the arm to move said roller toward its locking position.

6. A mounting mechanism as set forth in claim 3 which further includes a lost-motion connection between said support and said roller means.

7. A mounting mechanism as set forth in claim 6 in which said roller is loosely mounted for rotaation on the end of an arm which is pivotally mounted on said support.

8. A mounting mechanism as set forth in claim 6 comprising an arm loosely pivotally mounted on said support, and said roller means being mounted for rotation on said arm.

9. A mounting mechanism as set forth in claim 7 in which said arm is resilient spring arm.

10. A mounting mechanism as set forth in claim 1 wherein said surface is constituted by the top surface of an elongate member and which further includes means retaining said wheels in rolling engagement with the upper surface of said elongate member for movement of the support along the length of said member.

11. A mounting mechanism as set forth in claim 10 in which said retaining means are additional rollers engaging the undersurface of said elongate members for rolling engagement therewith.

12. A mounting mechanism as set forth in claim 11 which further includes adjustable means securing the additional rollers to said support whereby the support may be mounted for rolling engagement along the length of the elongate members of different widths and thicknesses.

13. A mounting mechanism as set forth in claim 2 which further includes electrically powered means for driving said support along said surface, first means for actuating said powered means to drive said support in said one direction, and second means for actuating said powered means to drive said support in said other direction.

14. A mounting mechanism as set forth in claim 13 in which said first actuating means comprises a first electrical switch operable in response to movement of the releasing means for the first said locking means into its released position whereby the support is driven in said one direction, said second actuating means comprose a second electrical switch operable in response to movement of the releasing means for the second said locking means into its released position whereby the support is driven in the other direction.

15. A mounting mechanism as set forth in claim 14 in which said firstt electrical switch is conveniently accessible to one hand of an occupant of the seat and in which the second switch is conveniently accessible to the other hand of the occupant of the seat.

16. A mounting mechanism for a seat reciprocally movable along a surface comprising a support for said seat having first and second opposite interconnected said portions, first ans second sets of wheels mounted on said support respectively adjacent the first and second side portions for rolling engagement on said surface, first and second locking means each comprising a roller of substantially less circumference than that of the wheels respectively selectively movable between locking positions in which said first and second locking means concurrently releasably engage both said first and second wheel sets and said surface to prevent movement of said support on said surface and released positions in which at least one of said first and seconfd locking means is not engaged with both its respective wheel set and said surface thereby to permit movement of said support along said surface in the direction of the released one of said first and second locking means, said first and second locking means being normally biased toward their respective locking positions, first and second lost-motion connections respectively between said support and said first and second locking means comprising first and second arms loosely pivotally mounted on said support adjacent said first and second side portions, and said first and second locking means being rotatably mounted on said first and second arms thersby to permit movement of said first and second locking means to their respective released positions, and means adjacent said first and second side portions and operable generally to selectively move said first and second locking means to released positions.

17. A mounting mechanism as set forth in claim 16. in which said first and second arms are first and second resilient spring arms.

18. A mounting mechanism as set forth in claim 16, wherein said first and second arms comprise first and second plates extending generally laterally of said first and second portions, and said first and second plates being respectively pivotally actuated in response to an applied force thereon to move said firsy and second locking means to their released positions.

19. A mounting mechanism as set forth in claim 16 comprising a friction wheel engaged with said surface, a reversible electric motor mounted on said support and drivingly engaged with said friction wheel, first and second electric switches for energizing said motor to drive said friction wheel along said surface and move said support in the direction of the released one of said first and and second locking means, and said release means also being operale selectively to actuate one of said first and seconnd switches upon movement of a respective one of said first and second locking means to its released position.

20. A movable seat unit for installation in a boat comprising:
  means comprising an elongate member adapted for mounting athwartships of a boat;
  a carriage having wheels rolling on said elongate member adapted for movement along said elongate member athwartships of the boat;
  a seat on the carriage; and
  means for releasably locking the carriage in various positions along the length of said elongate member, said locking means being positioned for manual actuation by an occupant of the seat and including a roller adapted to be wedged between a wheel of the carriage and the elongate member, said roller having a circumference substantially less than that of said wheel.

21. A movable seat unit as set forth in claim 20, wherein said locking means includes a first such roller for releasably locking the carriage against movement to port while allowing it to move to starboard and a second such roller for releasably locking the carriage against movement to starboard while allowing it to move to port.

22. A movable seat unit as set forth in claim 21, wherein the first means is reachable by the one hand of the occupant of the seat and the second means is reachable by the other hand of the occupant.

23. A movable seat unit as set forth in claim 22, wherein said rollers are substantially more resilient than said wheels and when in a locking position are compressed by being pinched in the nip between one side of the wheel of the carriage and the surface of the elongate member.

* * * * *